(12) United States Patent
Takanohashi et al.

(10) Patent No.: US 6,865,963 B2
(45) Date of Patent: Mar. 15, 2005

(54) APPARATUS AND METHOD FOR LUBRICATING FEED MECHANISM OF FORMING MACHINE

(75) Inventors: Ryuichi Takanohashi, Chiba (JP); Mitsuo Suzuki, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 253 days.

(21) Appl. No.: 10/143,955

(22) Filed: May 14, 2002

(65) Prior Publication Data

US 2002/0172733 A1 Nov. 21, 2002

(30) Foreign Application Priority Data

| May 16, 2001 | (JP) | 2001-146282 |
| Jun. 27, 2001 | (JP) | 2001-193845 |
| Feb. 27, 2002 | (JP) | 2002-050708 |
| Feb. 27, 2002 | (JP) | 2002-050744 |

(51) Int. Cl.[7] .............................. F16H 27/02
(52) U.S. Cl. ..................... 74/89.44; 184/6.21
(58) Field of Search .................. 74/89.4, 89.44; 184/5, 100, 6.21, 6.22, 6.24, 7.1

(56) References Cited

U.S. PATENT DOCUMENTS

| 1,453,532 A | * | 5/1923 | Stevens .................... 74/467 |
| 2,403,092 A | * | 7/1946 | Lear ....................... 74/89.26 |
| 3,331,469 A | * | 7/1967 | Deflandre ................. 184/6.14 |
| 4,000,664 A | * | 1/1977 | Christensen .............. 74/89.44 |
| 4,052,076 A | | 10/1977 | Wysong |
| 5,809,838 A | * | 9/1998 | Miyaguchi et al. ........ 74/89.44 |
| 6,216,821 B1 | | 4/2001 | Namimatsu et al. |
| 2002/0170369 A1 | * | 11/2002 | Yabe ....................... 74/89.44 |

FOREIGN PATENT DOCUMENTS

| DE | 195 19 770 A1 | 12/1995 |
| JP | 2001-058342 | 3/2001 |
| JP | 2001-248707 | 9/2001 |

OTHER PUBLICATIONS

Patent Abstracts of Japan, vol. 2000, No. 13, Feb. 5, 2001.
Patent Abstracts of Japan, vol. 2000, No. 2, Feb. 29, 2000.
Patent Abstracts of Japan, JP 11-123748, May 11, 1999.
Patent Abstracts of Japan, JP 09-220751, Aug. 26, 1997.
Patent Abstracts of Japan, JP 2001-248707, Sep. 14, 2001.

* cited by examiner

Primary Examiner—David M. Fenstermacher
(74) Attorney, Agent, or Firm—Squire, Sanders & Dempsey L.L.P.

(57) ABSTRACT

A lubrication apparatus lubricates a feed mechanism of a molding machine. The lubrication apparatus includes a storage member for storing lubrication oil therein, and a lubrication oil circulation pipe connected to the storage member.

40 Claims, 14 Drawing Sheets

APPARATUS AND METHOD FOR LUBRICATING FEED MECHANISM OF FORMING MACHINE

BACKGROUND OF THE INVENTION

1. Field of the Invention

The present invention relates to an apparatus and method for lubricating a feed mechanism of a forming machine. Description of the 2. Related Art Conventionally, in a forming machine, such as an injection molding machine, resin heated and melted in a heating cylinder is injected into a cavity of a mold apparatus under high pressure so that the cavity is filled with the molten resin. The molten resin is then cooled and solidified within the cavity so as to produce a molded article.

The mold apparatus consists of a stationary mold and a movable mold. A mold clamping apparatus for advancing and retracting the movable mold is provided so as to bring the movable mold into contact with the stationary mold and separate the same from the stationary mold, to thereby effect mold closing, mold clamping, and mold opening.

The mold clamping apparatus has a toggle mechanism for advancing and retracting the movable mold. The toggle mechanism is operated through drive of a drive source, such as an electric motor or a servomotor, disposed at a drive section.

FIG. 1 is a sectional view of a drive section of a conventional mold clamping apparatus.

In FIG. 1, reference numeral 51 denotes a servomotor serving as a drive source. The servomotor 51 is attached to an unillustrated stationary member, such as a toggle support, and has a rotary shaft 52. The front end (right-hand end in FIG. 1) of the rotary shaft 52 is coupled to the rear end (left-hand end in FIG. 1) of a ball-screw shaft 56 via a coupling 53. A key groove is formed on each of the outer circumferential surface of the rotary shaft 52, the outer circumferential surface of the ball-screw shaft 56, and the inner circumferential surface of the coupling 53; and keys 54 are fitted into the key grooves. Thus, rotation of the rotary shaft 52 is transmitted to the ball-screw shaft 56 via the coupling 53.

The ball-screw shaft 56 is rotatably supported by bearings 57 accommodated within a bearing housing 58, which is attached to the unillustrated stationary member, such as a toggle support. The outer rings of the bearings 57 are retained by means of a plate 59 attached to the bearing housing 58. The ball-screw shaft 56 is fixedly attached to the inner rings of the bearings 57 by means of a nut 60, so that the ball-screw shaft 56 cannot move along the axial direction.

A screw groove is formed on the outer circumference of the ball-screw shaft 56 over substantially the entire length thereof, and the ball-screw shaft 56 is in screw-engagement with a ball-screw nut 61. The ball-screw shaft 56 and the ball screw nut 61 constitute a ball-screw-type feed mechanism. The ball-screw nut 61 is attached to a cross head 62 of a toggle mechanism, which is slidable along guide bars 63.

Therefore, when the servomotor 51 is operated, rotation of the rotary shaft 52 is transmitted to the ball-screw shaft 56, and the ball-screw nut 61 in screw-engagement with the ball-screw shaft 56 moves along the axis of the ball-screw shaft 56. As a result, the cross head 62 is moved leftward and rightward in FIG. 1. When the cross head 62 is advanced (moved rightward in FIG. 1), the toggle mechanism extends so as to advance an unillustrated movable platen, to thereby perform mold closing and mold clamping. When the cross head 62 is retracted (moved leftward in FIG. 1), the toggle mechanism contracts so as to retract the movable platen, to thereby perform mold opening.

Since large torque is required to effect mold closing, mold clamping, and mold opening, heavy load acts on a ball screw that is constituted by the ball-screw shaft 56 and the ball-screw nut 61. In view of this, grease serving as a lubricant is supplied to the ball screw in order to enable smooth movement of the ball screw serving as a feed mechanism and prevent wear of the ball screw to thereby prolong the service life of the ball screw.

However, in the conventional ball screw serving as a feed mechanism, since grease is used for lubrication, maintaining a uniform film of lubricant at the contact surfaces between the balls and the screw is difficult. Consequently, lubrication conditions at respective portions of the ball screw become uneven. In particular, when the stroke of movement of the ball-screw shaft relative to the ball-screw nut is short, the grease is pushed out from the contact surfaces between the balls and the screw, and therefore, maintaining the lubricant film is difficult. As a result, there arises a variation in service life among the respective portions of the ball screw, thereby shortening the overall service life of the ball screw.

When the supply rate of grease is set greater than a required rate in order to guarantee that grease is distributed sufficiently to respective portions of the ball screw, consumption of grease increases. In general, grease is expensive, and therefore, the increased consumption of grease renders maintenance cost of the forming machine extremely high. Further, when the supply rate of grease is increased, excessive grease overflows, scatters, and contaminates the forming machine and an area surrounding the forming machine.

Further, when the ball screw is used for a long period of time, iron particles generated due to wear contaminate grease. If lubrication is performed by use of grease containing iron particles, contact surfaces are abraded by the iron particles. Therefore, grease containing iron particles must be discharged as soon as possible. However, when the supply rate of grease is increased in order to discharge grease containing iron particles as soon as possible, grease is discharged from the ball screw at a high rate, resulting in increased maintenance cost and contamination of the forming machine and an area surrounding the forming machine, as described above.

Moreover, since grasping the progress of wear of the ball screw is difficult, the service life of the ball screw cannot be predicted accurately. Therefore, in some cases the ball screw is used even after its service life has been reached. As a result, the feed mechanism of the forming machine operates erratically, whereby the accuracy of formed products decreases, and other components of the forming machine are affected adversely. Meanwhile, when the ball-screw shaft and the ball-screw nut are replaced prematurely in order to avoid use of the ball screw beyond its service life, the maintenance cost of the forming machine increases.

In view of the foregoing, there has been proposed a method for measuring the amount of iron contained in grease adhering to the ball-screw shaft and the ball-screw nut and predicting the service life of the ball screw. However, this method requires stopping a forming machine so as to collect grease adhering to the ball-screw shaft and the ball-screw nut. When the frequency of operation of collecting grease is increased in order to improve prediction accuracy, the total stoppage time of the forming machine increases, and the productivity of the forming machine decreases. Meanwhile, the frequency of operation of collecting grease is decreased in order to shorten the total stoppage time of the forming machine, prediction accuracy deteriorates.

SUMMARY OF THE INVENTION

An object of the present invention is to solve the above-mentioned problems in conventional techniques and to provide an apparatus and method for lubricating a feed mechanism of a forming machine which can maintain uniform film of lubrication oil on contact surfaces of respective portions of the feed mechanism to thereby prolong service lives of the respective portions of the feed mechanism, reduce maintenance cost, prevent contamination of the forming machine and an area surrounding the forming machine, and prevent wear of the contact surfaces.

Another object of the present invention is to provide an apparatus and method for lubricating a feed mechanism of a forming machine which can detect the amount of iron contained in lubrication oil and control the forming machine properly on the basis of the detected amount of iron.

In order to achieve the above objects, the present invention provides an apparatus for lubricating a feed mechanism of a forming machine, comprising a conversion mechanism for converting rotational motion to rectilinear motion or converting rectilinear motion to rotational motion; and a lubrication oil circulation pipe for supplying lubrication oil to the conversion mechanism and collecting the supplied lubrication oil.

This simple configuration enables maintenance of a uniform film of lubrication oil on contact surfaces of respective portions of the feed mechanism, to thereby prolong the service lives of the respective portions of the feed mechanism.

Preferably, the conversion mechanism includes a screw shaft having a spiral groove; a screw nut having a spiral groove of the same pitch as that of the spiral groove of the screw shaft; and a power transmission member disposed between the spiral groove of the screw shaft and the spiral groove of the screw nut and adapted to transmit power between the screw shaft and the screw nut.

In this case, no friction is produced between the screw shaft and the screw nut, and thus, power is transmitted smoothly. Therefore, rotational motion of one of the screw shaft and the screw nut is efficiently converted to rectilinear motion of the other of the screw shaft and the screw nut.

Preferably, the power transmission member is a group of balls or rollers.

In this case, since a sufficient quantity of lubrication oil is supplied to the peripheral surfaces of the balls or rollers, a lubrication oil film does not break, and therefore, the contact surfaces of the respective portions of the feed mechanism do not wear.

Preferably, the lubrication apparatus further comprises a storage member for storing lubrication oil in an amount such that at least a portion of the screw shaft is immersed in the lubrication oil.

In this case, since a sufficient quantity of lubrication oil is supplied to the peripheral surface of the screw shaft, a lubrication oil film does not break, and therefore, the contact surfaces of the respective portions of the feed mechanism do not wear.

Preferably, the storage member covers at least a portion of the screw shaft to an extent such that the portion is immersed in the lubrication oil.

Alternatively, the lubrication apparatus further comprises a storage member for storing lubrication oil in an amount such that at least a lower portion of a return tube of the screw nut is immersed in the lubrication oil.

Preferably, the storage member covers at least the return tube of the screw nut to an extent such that the return tube is immersed in the lubrication oil.

Preferably, the lubrication apparatus includes filter means disposed in the lubrication oil circulation pipe and adapted to remove impurities contained in the lubrication oil.

In this case, since impurities, such as iron particles and dust, contained in the lubrication oil are removed by the filter means, the contact surfaces of the feed mechanism are not worn away by the impurities, such as iron particles and dust, contained in the lubrication oil.

Preferably, the lubrication apparatus includes a cooling unit disposed in the lubrication oil circulation pipe and adapted to cool the lubrication oil 35.

In this case, since the respective portions of the feed mechanism are cooled by means of cooled lubrication oil, wear of the feed mechanism can be prevented.

Preferably, the lubrication apparatus includes an iron-content measurement unit disposed in the lubrication oil circulation pipe and adapted to measure iron content of the lubrication oil.

In this case, since the service life of the feed mechanism can be grasped in advance, the feed mechanism can be exchanged with a new one at proper timing.

Preferably, the lubrication apparatus includes control means for controlling the forming machine on the basis of the iron content measured by the iron-content measurement unit.

Preferably, the control means calculates a service life of the conversion mechanism on the basis of the measured iron content.

Preferably, the control means produces a warning for prompting exchange of the lubrication oil or the conversion mechanism when the measured iron content exceeds a predetermined level.

In this case, the timing for exchanging the lubrication oil or the feed mechanism can be grasped reliably.

The present invention provides a method for lubricating a feed mechanism of a forming machine, comprising supplying lubrication oil to a conversion mechanism for converting rotational motion to rectilinear motion or converting rectilinear motion to rotational motion; and collecting the supplied lubrication oil.

This method enables smooth and efficient conversion of rotational motion to rectilinear motion.

Preferably, the conversion mechanism transmits power by means of a screw shaft having a spiral groove; a screw nut having a spiral groove of the same pitch as that of the spiral groove of the screw shaft; and a power transmission member disposed between the spiral groove of the screw shaft and the spiral groove of the screw nut.

In this case, no friction is produced between the screw shaft and the screw nut, and thus, power is transmitted smoothly. Therefore, rotational motion of one of the screw shaft and the screw nut is efficiently converted to rectilinear motion of the other of the screw shaft and the screw nut.

Preferably, the power transmission member is a group of balls or rollers.

In this case, since a sufficient quantity of lubrication oil is supplied to the peripheral surfaces of the balls or rollers, a lubrication oil film does not break, and therefore, the contact surfaces of the respective portions of the feed mechanism do not wear.

Preferably, at least a portion of the screw shaft is immersed in the lubrication oil.

Preferably, at least a portion of the screw shaft is covered by a storage member to an extent such that the portion is immersed in the lubrication oil.

Alternatively, at least a lower portion of a return tube of the screw nut is immersed in the lubrication oil.

Preferably, at least a portion of the return tube of the screw nut is covered by storage member to an extent such that the portion is immersed in the lubrication oil.

Preferably, impurities contained in the lubrication oil are removed by filter means disposed in the lubrication oil circulation pipe.

In this case, since impurities, such as iron particles and dust, contained in the lubrication oil are removed by the filter means, the contact surfaces of the feed mechanism are not worn away by the impurities, such as iron particles and dust, contained in the lubrication oil.

Preferably, the lubrication oil is cooled by a cooling unit disposed in the lubrication oil circulation pipe.

In this case, since the respective portions of the feed mechanism are cooled by means of cooled lubrication oil, wear of the feed mechanism can be prevented.

Preferably, iron content of the lubrication oil is measured by use of an iron-content measurement unit disposed in the lubrication oil circulation pipe.

Preferably, the forming machine is controlled by use of control means and on the basis of the iron content measured by the iron-content measurement unit.

Preferably, the service life of the conversion mechanism is calculated by use of the control means and on the basis of the measured iron content.

Preferably, the control means produces a warning for prompting exchange of the lubrication oil or the conversion mechanism when the measured iron content exceeds a predetermined level.

BRIEF DESCRIPTION OF DRAWINGS

The structure and features of the apparatus and method for lubricating a feed mechanism of a forming machine according to the present invention will be readily appreciated as the same becomes better understood by reference to the drawings, in which.

DESCRIPTION OF PREFERRED EMBODIMENTS

Embodiments of the present invention will next be described in detail with reference to the drawings. Although the apparatus and method for lubricating a feed mechanism of a forming machine according to the present invention can be applied to various forming machines, such as extrusion molding machines, laminators, transfer molding machines, die casting machines, and IJ encapsulation presses, here, a case in which the present invention is applied to an injection molding machine will be described.

Figure 1:
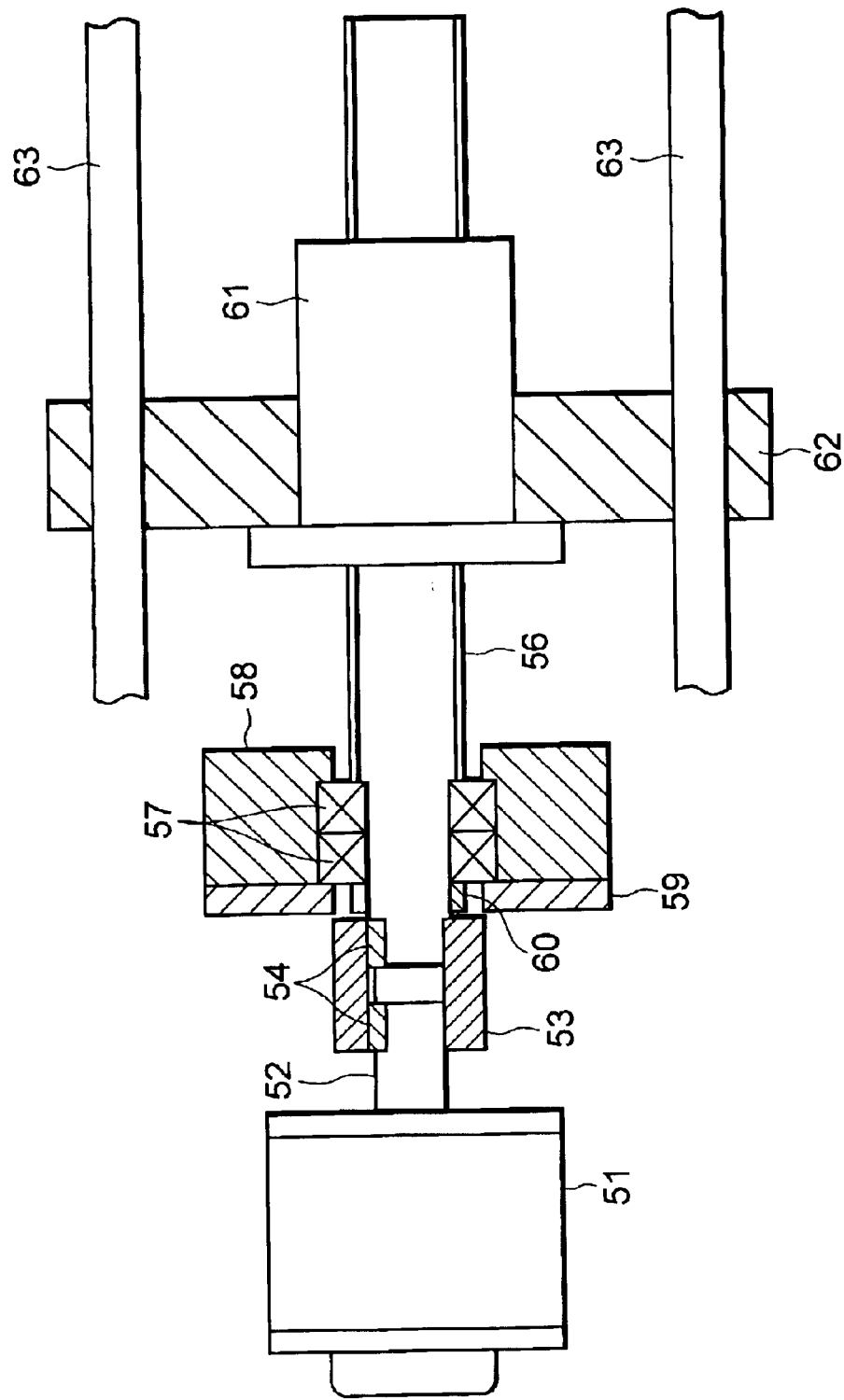
FIG. 1 is a cross-sectional view of a drive section of a conventional mold clamping apparatus.
Figure 2:
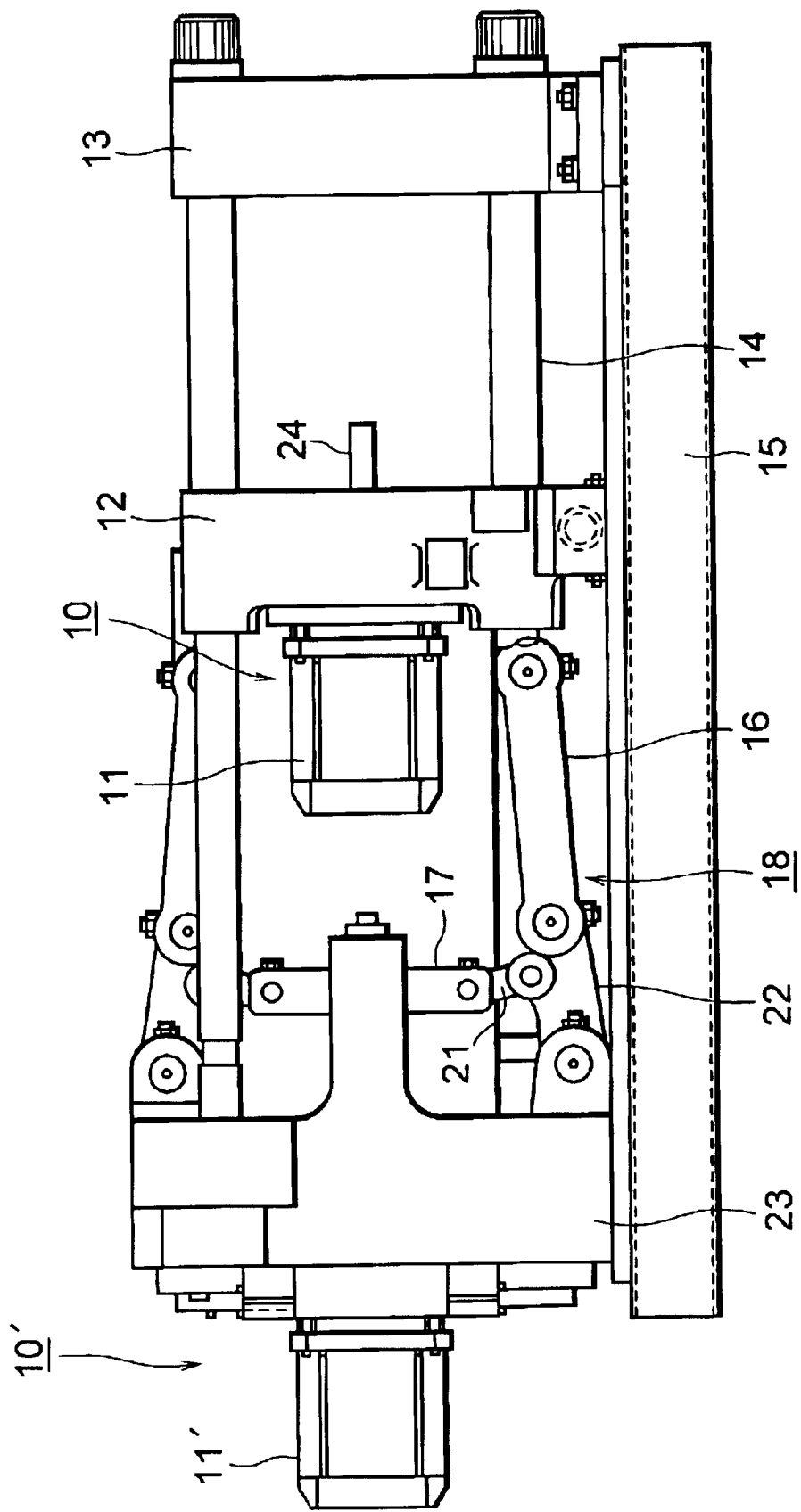
FIG. 2 is a schematic view of a mold clamping apparatus of an injection molding machine according to a first embodiment of the present invention.

FIG. 2 is a schematic view of a mold clamping apparatus of an injection molding machine according to a first embodiment of the present invention.

In FIG. 2, reference numeral 15 denotes a frame; 13 denotes a stationary platen, which is fixed to the frame 15; 23 denotes a toggle support, serving as a base plate, which is movably disposed on the frame 15 and is separated a predetermined distance from the stationary platen 13; 14 denotes tie bars which are disposed to extend between the stationary platen 13 and the toggle support 23; and 12 denotes a movable platen which is disposed to face the stationary platen 13 and is reciprocatable (can be moved leftward and rightward in FIG. 2) along the tie bars 14. An unillustrated stationary mold is attached to a surface of the stationary platen 13, which surface faces the movable platen 12. An unillustrated movable mold is attached to a surface of the movable platen 12, which surface faces the stationary platen 13.

A dive unit 10 is attached to the rear end (left-hand end in FIG. 2) of the movable platen 12. The drive unit 10 includes a motor 11 serving as a drive source and adapted to advance and retract (move leftward and rightward in FIG. 2) an ejector rod 24, which is a member to be moved. The advancement and retraction of the ejector rod 24 causes advancement and retraction motions of an unillustrated ejector pin which projects into the cavity of the movable mold of the mold apparatus, to thereby eject a molded product. The motor 11 may be any type of motor; however, a servomotor is preferably used as the motor 11.

A toggle mechanism 18 is disposed between the movable platen 12 and the toggle support 23. A drive unit 10' serving as a drive means for mold clamping operation of the injection molding machine is attached to the rear end (left-hand end in FIG. 2) of the toggle support 23. The drive unit 10' includes a motor 11' serving as a drive source and adapted to advance and retract a cross head 17, which is a member to be moved, to thereby operate the toggle mechanism 18. Thus, the movable platen 12 is advanced (moved rightward in FIG. 2) to thereby perform mold closing. Further, a clamping force, which is the product of a thrust force generated by the motor 11' and a toggle magnification ratio, is generated in order to perform mold clamping with the clamping force. In the present embodiment, the clamping force is generated through operation of the toggle mechanism 18. However, the thrust force generated by the motor 11' can be transmitted directly to the movable platen 12 as a clamping force, without use of the toggle mechanism 18.

The toggle mechanism 18 includes toggle levers 21 swingably supported by the cross head 17; toggle levers 22 swingably supported by the toggle support 23; and toggle arms 16 swingably supported by the movable platen 12. The toggle levers 21 are linked with the toggle levers 22. The toggle levers 22 are linked with the toggle arms 16.

Next, a lubrication apparatus for a feed mechanism of the drive unit 10 will be described.

Figure 4:
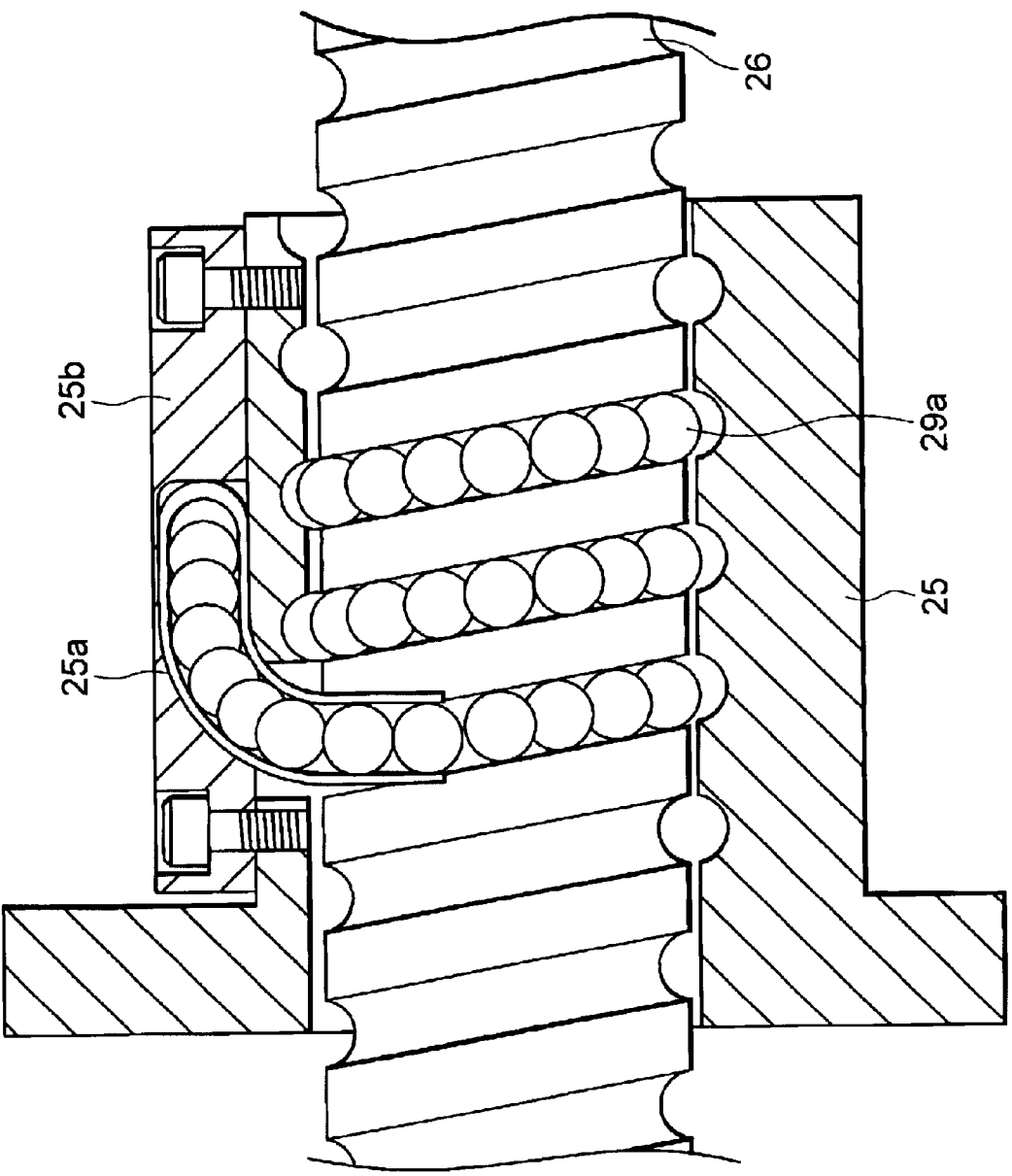
FIG. 4 is a cross-sectional view showing a first example structure of the feed mechanism according to the first embodiment of the present invention.
Figure 5:
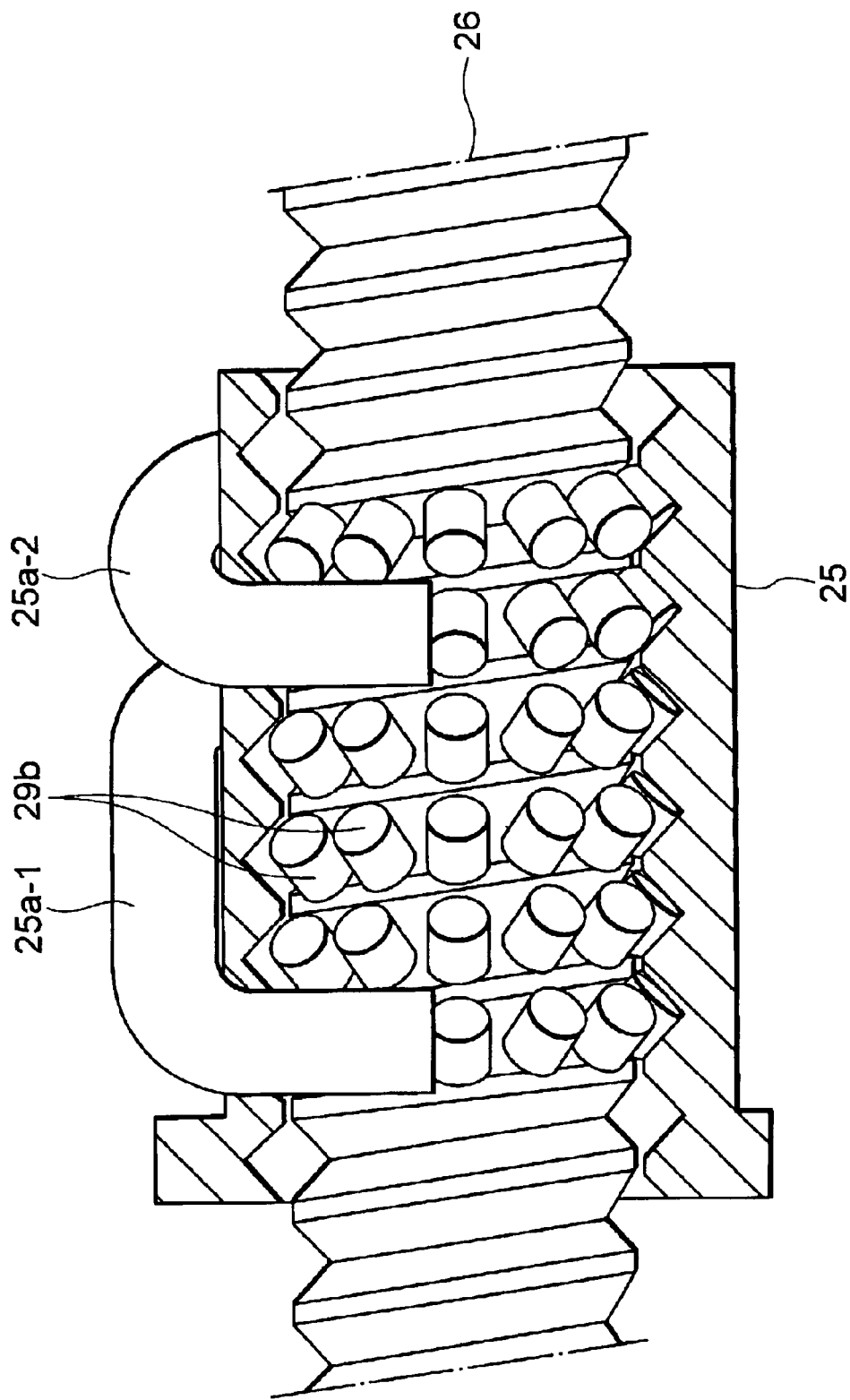
FIG. 5 is a cross-sectional view showing a second example structure of the feed mechanism according to the first embodiment of the present invention.
Figure 6:
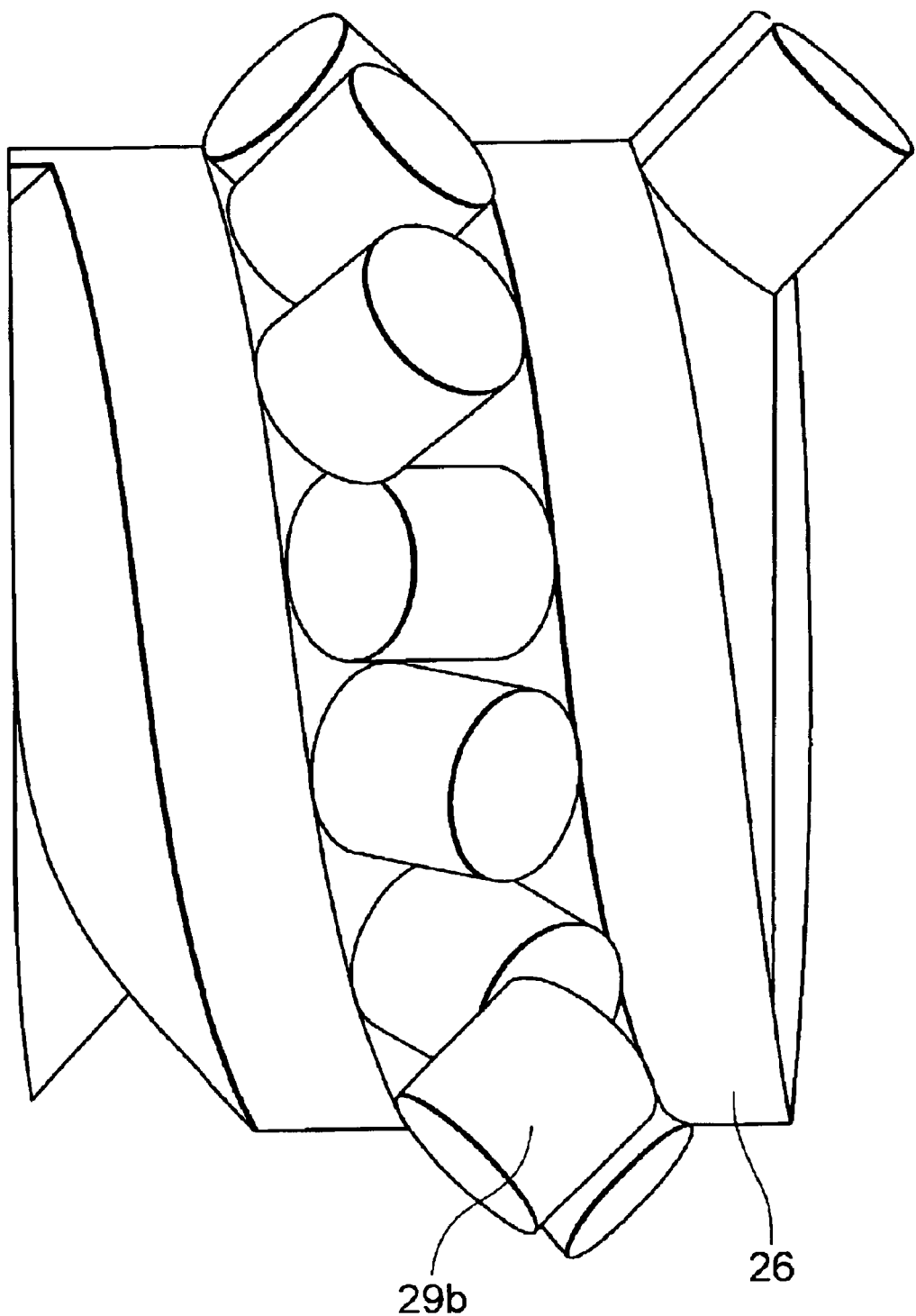
FIG. 6 is a schematic view showing a third example structure of the feed mechanism according to the first embodiment of the present invention.
Figure 7:
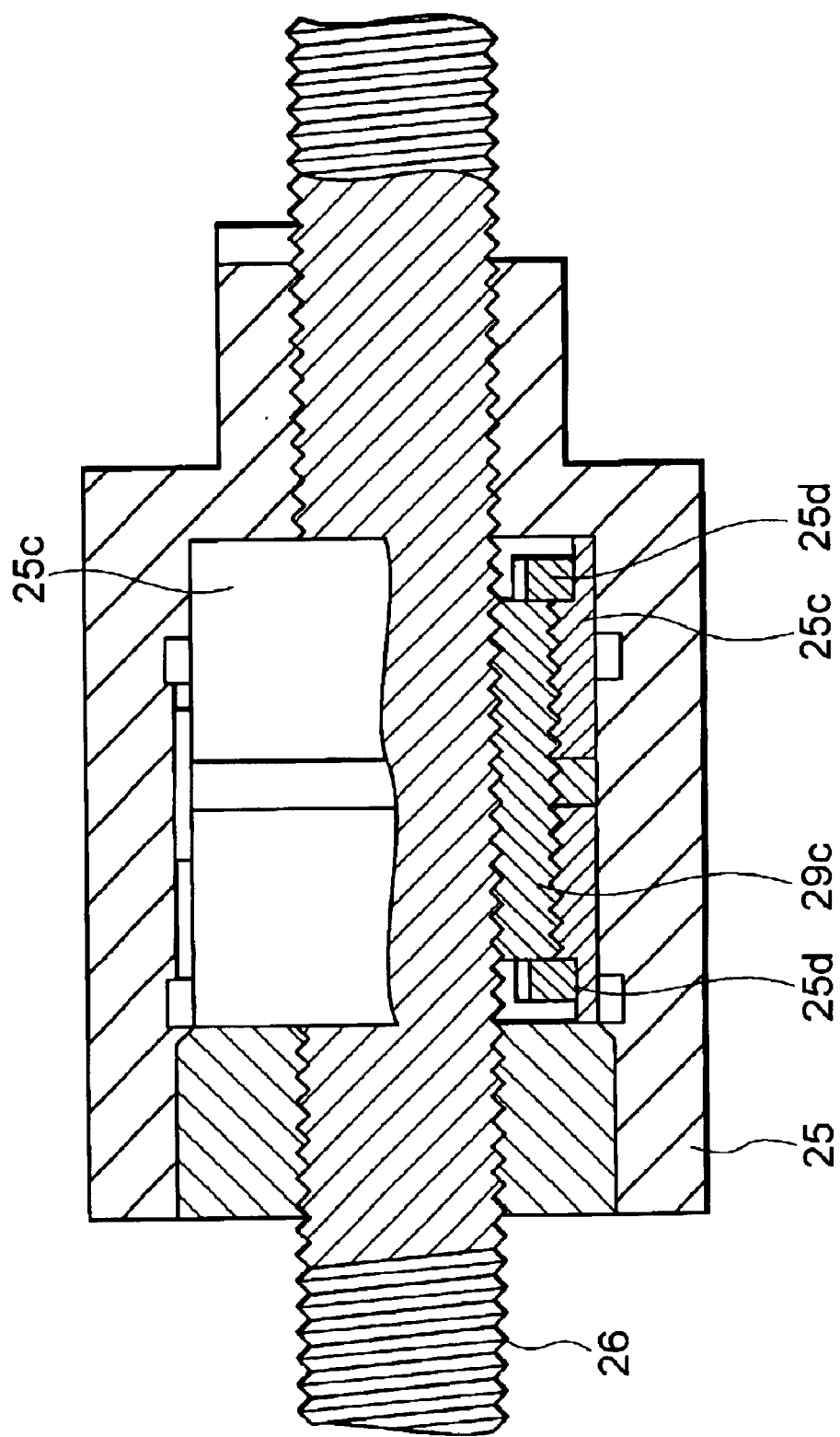
FIG. 7 is a cross-sectional view showing a fourth example structure of the feed mechanism according to the first embodiment of the present invention.

FIG. 4 is a cross-sectional view showing a first example structure of the feed mechanism according to the first embodiment of the present invention; FIG. 5 is a cross-sectional view showing a second example structure of the feed mechanism according to the first embodiment of the present invention; FIG. 6 is a cross-sectional view showing a third example structure of the feed mechanism according to the first embodiment of the present invention; and FIG. 7 is a cross-sectional view showing a fourth example structure of the feed mechanism according to the first embodiment of the present invention.

In FIG. 4, reference numeral 25 denotes a screw nut, and 26 denotes a screw shaft. The screw shaft 26 and the screw nut 25 have spiral grooves, respectively, which are formed at the same pitch. A plurality of balls 29a, collectively serving as a power transmission member, are disposed between the spiral groove of the screw shaft 26 and the spiral groove of the screw nut 25. A return tube 25a is attached to the screw nut 25 by means of a return-tube attachment member 25b. This configuration enables the balls 29a to circulate, while rolling, through the space between the spiral groove of the screw shaft 26 and the spiral groove of the screw nut 25, as well as through the interior of the return tube 25a.

In the feed mechanism, the plurality of balls 29a transmit power between the screw shaft 26 and the screw nut 25, while rolling. Therefore, no friction is generated between the screw shaft 26 and the screw nut 25, and power is smoothly transmitted therebetween. Therefore, rotational motion of the screw shaft 26 is efficiently converted to rectilinear motion of the screw nut 25. Alternatively, rotational motion of the screw nut 25 is efficiently converted to rectilinear motion of the screw shaft 26.

In the present embodiment, the power transmission member may be rollers. In this case, as shown in FIG. 5, a plurality of rollers 29b, collectively serving as a power transmission member, are disposed between the spiral groove of the screw shaft 26 and the spiral groove of the screw nut 25. Notably, the spiral groove of the screw shaft 26 and the spiral groove of the screw nut 25 have the same pitch. In this case, two return tubes 25a-1 and 25a-2 are provided. Rollers 29b which pass through the return tube 25a-1 and rollers 29b which pass through the return tube 25a-2 are inclined in opposite directions. Notably, rollers 29b inclined in one direction and rollers 29b inclined in the opposite direction may be disposed alternately, as shown in FIG. 6.

In this case, the direction of inclination of the rollers 29b is determined in consideration of the axial direction in which the feed mechanism receives a load. Thus, the feed mechanism can bear a heavier load, and can efficiently convert rotational motion to rectilinear motion.

In the present embodiment, the power transmission member may be a planetary roller. In this case, as shown in FIG. 7, a plurality of planetary rollers 29c, collectively serving as a power transmission member, are disposed between the spiral groove of the screw shaft 26 and a spiral groove formed on a screw-groove formation member 25c of the screw nut 25. Notably, the spiral groove of the screw shaft 26 and the spiral groove of the screw-groove formation member 25c of the screw nut 25 have the same pitch. Further, a spiral thread is formed on the perimeter of each of the planetary rollers 29c at the same pitch as the spiral grooves. The spiral threads of the planetary rollers 29c are in screw-engagement with the spiral groove of the screw shaft 26 and the spiral groove of the screw-groove formation member 25c of the screw nut 25. Notably, the screw nut 25 and the screw-groove formation member 25c may be formed as a single member.

The planetary rollers 29c are disposed around the screw shaft 26 in such manner that the center axes of the planetary rollers 29c become parallel to the axis of the screw shaft 26. The opposite ends of the planetary rollers 29c are rotatably supported by guide rings 25d secured to the screw-groove formation member 25c. This configuration enables the planetary rollers 29c to transmit power between the screw shaft 26 and the screw nut 25 while rotating.

In this case, since the backlash between the screw shaft 26 and the planetary rollers 29c and the backlash between the screw-groove formation member 25c and the planetary rollers 29c are extremely small, rotational motion can be converted to rectilinear motion with high accuracy.

In the present embodiment, the feed mechanism may have any one of the above-described configurations. Here, a case in which balls are used as the power transmission member will be described.

Figure 3:
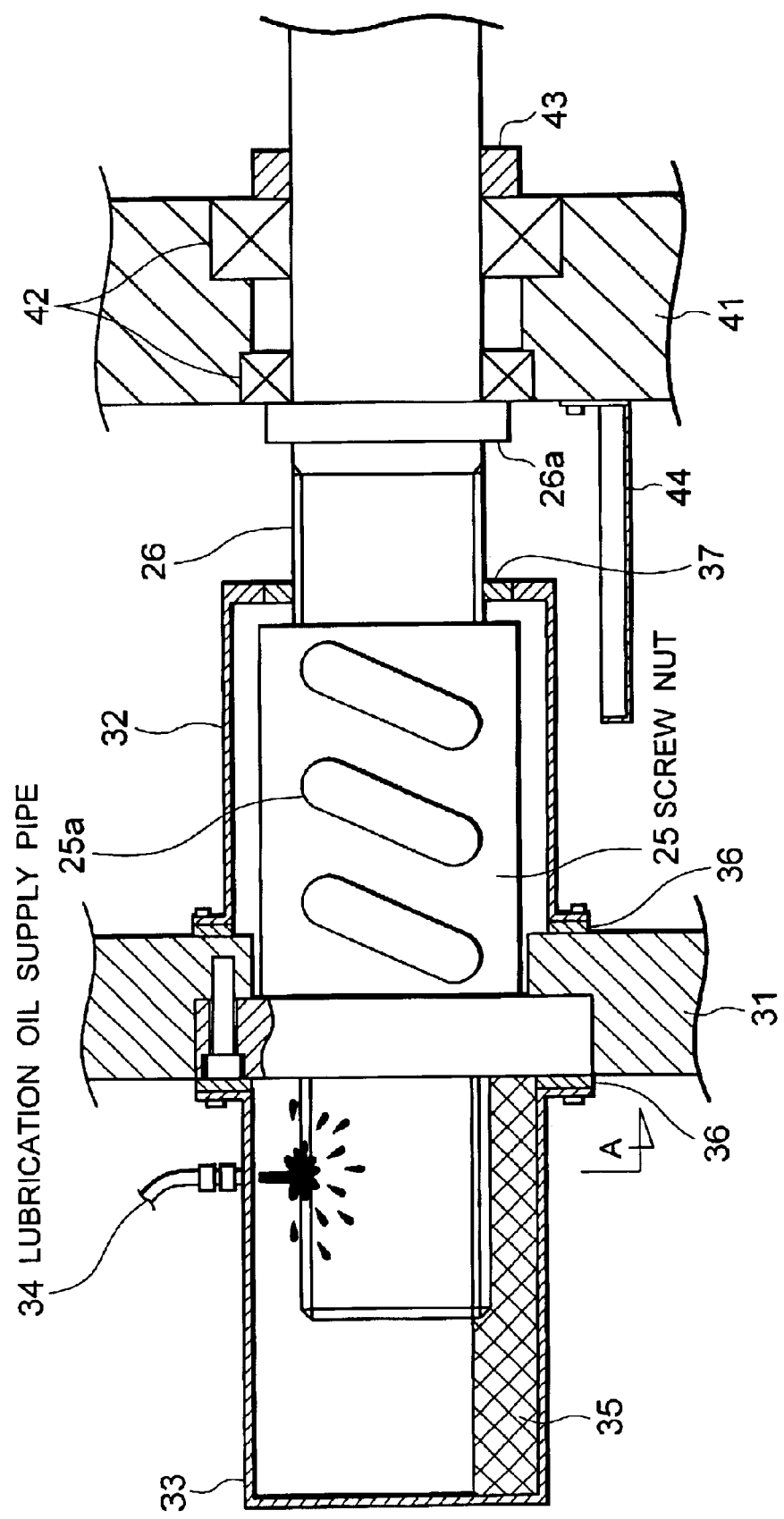
FIG. 3 is a cross-sectional view of a lubrication apparatus for a feed mechanism according to the first embodiment of the present invention.
Figure 8:
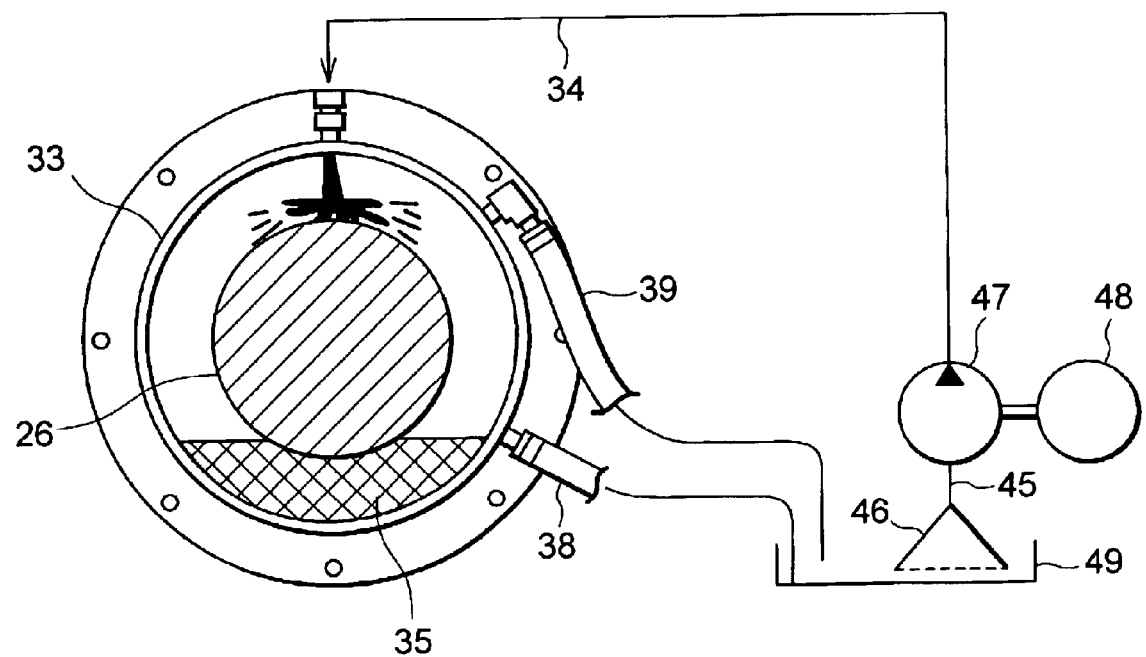
FIG. 8 is a cross-sectional view as viewed in the direction of arrow A in FIG. 3.

FIG. 3 is a cross-sectional view of a lubrication apparatus for the feed mechanism according to the first embodiment of the present invention; and FIG. 8 is a cross-sectional view as viewed in the direction of arrow A in FIG. 3.

In FIG. 3, the screw nut 25 of the feed mechanism is fixed to a nut support member 31 by use of, for example, bolts.

The nut support member 31 may be a stationary member such as the toggle support 23, or a movable member such as the cross head 17. The screw shaft 26, which has a spiral groove on the perimeter thereof, is in screw-engagement with the screw nut 25. The right-hand end (in FIG. 3) of the screw shaft 26 is connected directly, or indirectly, to an unillustrated drive source, such as the above-described motor 11. The screw shaft 26 is rotated by the drive source.

A portion of the screw shaft 26 in which no groove is formed is attached to a screw-shaft support member 41 via bearings 42. The screw shaft 26 has an integrally formed flange portion 26a. The screw shaft 26 is fixed to the inner rings of the bearings 42 by means of the flange portion 26a and a fixing member 43, such as a lock nut, fixed to the screw shaft 26. Thus, the screw shaft 26 and the screw-shaft support member 41 are coupled to each other in such a manner that they can rotate relative to each other but cannot move relative to each other along the axial direction.

When rotation of the screw-shaft support member 41 is prohibited by a member such as a guide member, only the reciprocative motion; i.e., axial rectilinear motion, of the screw shaft 26 is transmitted to the screw-shaft support member 41.

When relative rotation occurs between the screw nut 25 and the screw shaft 26, the screw nut 25 axially moves relative to the screw shaft 26. Therefore, when the nut support member 31 is a stationary member, the screw-shaft support member 41 is a movable member such as the cross head 17; and when the nut support member 31 is a movable member, the screw-shaft support member 41 is a stationary member such as the toggle support 23.

A nut cover member 32 (storage member) for covering the perimeter of the screw nut 25 is fixed to the nut support member 31 by use of, for example, bolts. The nut cover member 32 assumes a cylindrical shape and has an open end and a closed bottom, which has a circular hole formed therein. The open end of the nut cover member 32 is attached to the nut support member 31. The screw shaft 26 passes through the circular hole formed in the bottom wall.

A first seal member 36 such as a packing is disposed between the nut cover member 32 and the nut support member 31 in order to establish a fluid-tight condition to thereby prevent leakage of lubrication oil 35. Further, a second seal member 37 such as an oil seal is disposed between the inner circumferential surface of the circular hole and the outer circumferential surface of the screw shaft 26 in order to establish a fluid-tight condition to thereby prevent leakage of the lubrication oil 35. An oil pan 44 is attached to a side surface (left side surface in FIG. 3) of the screw-shaft support member 41, which surface faces the screw nut 25, and extends to a point below the nut cover member 32. Therefore, when the lubrication oil 35 leaks from the clearance between the inner circumferential surface of the circular hole and the outer circumferential surface of the screw shaft 26, the leaked lubrication oil 35 is received by the oil pan 44 without dripping further downward.

A screw-shaft cover member 33 (storage member) is attached to the side of the nut support member 31 opposite the nut cover member 32 by use of, for example, bolts. The screw-shaft cover member 33 covers the perimeter of an end portion of the screw shaft 26 which projects from the screw nut 25 toward the side opposite the nut cover member 32. The screw-shaft cover member 33 assumes a cylindrical shape and has an open end and a closed end; i.e., a closed bottom. The open end of the screw shaft cover member 33 is attached to the nut support member 31. A first seal member 36 such as a packing is disposed between the screw-shaft cover member 33 and the nut support member 31 in order to establish a fluid-tight condition to thereby prevent leakage of the lubrication oil 35.

As shown in FIG. 8, a lubrication oil supply pipe 34 and a lubrication oil discharge pipe 38, serving as a lubrication oil circulation pipe, and an air bleeder pipe 39 are connected to the screw-shaft cover member 33. One end of the lubrication oil supply pipe 34 is connected to a top portion of the screw-shaft cover member 33, and the other end of the lubrication oil supply pipe 34 is connected to a lubrication oil supply pump 47. A suction pipe 45, serving as a lubrication oil circulation pipe, is attached to the lubrication oil supply pump 47, and filter means 46 is attached to the lower end of the suction pipe 45. The lubrication oil 35, which the lubrication oil supply pump 47 pumps from a lubrication oil tank 49 via the suction pipe 45 and the filter means 46, is supplied to the interior of the screw-shaft cover member 33 via the lubrication oil supply pipe 34. The lubrication oil supply pump 47 is driven by a pump drive source 48 such as an electric motor.

As shown in FIG. 8, one end of the lubrication oil discharge pipe 38 is connected to a lower side portion of the screw-shaft cover member 33, and the other end of the lubrication oil discharge pipe 38 is connected to the lubrication oil tank 49. By virtue of this configuration, the quantity of the lubrication oil 35 stored inside the screw-shaft cover member 33 is controlled in such a manner that the oil level does not exceed the point at which the lubrication oil discharge pipe 38 is connected to the screw-shaft cover member 33. As a result, only a bottom portion of the screw shaft 26 is immersed in the lubrication oil 35. As shown in FIG. 8, one end of the air bleeder pipe 39 is connected to a upper side portion of the screw-shaft cover member 33, and the other end of the air bleeder pipe 39 is connected to the vicinity of the lubrication oil tank 49. The air bleeder pipe 39 introduces air into the interior of the sealed screw-shaft cover member 33 to thereby enable the lubrication oil 35 to be discharged smoothly from the lubrication oil discharge pipe 38.

The filter means 46 attached to the lower end of the suction pipe 45 is immersed in the lubrication oil 35 stored in the lubrication oil tank 49. When the lubrication oil supply pump 47 pumps the lubrication oil 35 from the lubrication oil tank 49, the lubrication oil 35 is caused to pass through the filter means 46. Therefore, impurities such as iron particles and dust contained in the lubrication oil 35 are filtered out. Preferably, the filter means 46 is removably attached to the suction pipe 45. Further, preferably, the filter means 46 has a filtering material, such as filter paper or wire mesh; i.e., a filter element in a removable form such as a cassette. In this case, the filter element can be exchanged with ease when a large quantity of impurities such as iron particles and dust have accumulated in the filter element due to use over a long period of time.

Next, operation of the lubrication apparatus having the above-described configuration will be described.

When the motor 11 serving as a drive source is operated, the screw shaft 26 is rotated. Since the screw shaft 26 is in screw-engagement with the screw nut 25 fixedly attached to the nut support member 31, upon rotation of the screw shaft 26, the screw shaft 26 and the screw nut 25 move (i.e., advance or retract) relative to each other in the axial direction. Notably, whether the screw shaft 26 and the screw nut 25 advance or retract relative to each other is determined by the direction of the screw thread and the rotational direction of the screw shaft 26.

As result, the screw-shaft support member 41 and the nut support member 31 move relative to each other in the axial direction. For example, when the nut support member 31 is a stationary member such as the toggle support 23 and the screw-shaft support member 41 is a movable member such as the cross head 17, the screw-shaft support member 41 is advanced or retracted along the axis of the screw shaft 26.

As described above, the lubrication oil 35 is stored within the screw-shaft cover member 33; and, as shown in FIGS. 3 and 8, the oil level is set slightly higher than the lowest point of the screw shaft 26. In other words, a lower portion of the screw shaft 26 is immersed in the lubrication oil 35. Therefore, when the screw shaft 26 rotates, the lubrication oil 35 comes to cover the entire surface of the portion of the screw shaft 26 located within the screw-shaft cover member 33. In addition, the lubrication oil 35 flows along the spiral groove formed on the perimeter of the screw shaft 26 and enters the space between the screw nut 25 and the screw shaft 26. Since the screw shaft 26 axially moves relative to the screw nut 25 and the screw-shaft cover member 33, the lubrication oil 35 is sufficiently supplied to the inner circumferential surface (i.e., the spiral groove) of the screw nut 25 and a portion of the screw shaft 26 which projects rightward from the screw nut 25 in FIG. 3.

By virtue of sufficient supply of the lubrication oil 35, a film of the lubrication oil 35 is formed on the surface of the spiral groove of the screw shaft 26, the surfaces of the balls 29a held within the screw nut 25, and the surface of the spiral groove of the screw nut 25, thereby improving the lubrication conditions at the ball screw portion. As a result, the movement of the ball screw becomes smooth, and wear of the ball screw can be prevented, whereby the service life of the ball screw can be prolonged.

A portion of the lubrication oil 35 flows along the spiral groove formed on the perimeter of the screw shaft 26 to thereby move rightward in FIG. 3 beyond the screw nut 25. However, since the second seal member 37 such as an oil seal is disposed between the inner circumferential surface of the circular hole of the nut cover member 32 and the outer circumferential surface of the screw shaft 26, the lubrication oil 35 hardly leaks to the outside of the nut cover member 32. Even when the lubrication oil 35 leaks outside along the spiral groove of the screw shaft 26, the lubrication oil 35 leaks in a very small amount; i.e. oozes out. Since such an oozing portion of the lubrication oil 35 is received by the oil pan 44, the lubrication oil 35 does not drip down.

The pump drive source 48 is operated periodically in order to drive the lubrication oil supply pump 47. As a result, the lubrication oil 35 stored in the lubrication oil tank 49 is pumped via the filter means 46 and the suction pipe 45 and is supplied to the interior of the screw shaft cover member 33 via the lubrication oil supply pipe 34. Thus, the oil level within the screw-shaft cover member 33 rises, and an excessive portion of the lubrication oil 35 is discharged from the lubrication oil discharge pipe 38 and is caused to return to the lubrication oil tank 49. When the lubrication oil 35 is caused to circulate in the above-described manner, impurities, such as iron particles and dust, contained in the portion of the lubrication oil 35 stored in the screw shaft cover member 33 are removed by the filter means 46, thereby cleaning the lubrication oil 35.

The operation for driving the lubrication oil supply pump 47 by operating the pump drive source 48 may be performed, for example, once every week, once every day, or once every hour. Alternatively, the lubrication oil supply pump 47 may be operated continuously in order to circulate the lubrication oil 35 at all times. The filter element, which may be loaded with impurities such as iron particles and dust, may be replaced at predetermined time intervals or whenever the operation time of the injection molding machine reaches a predetermined time.

When the feed mechanism is used over a long period of time due to long-term operation of the injection molding machine, the lubrication oil 35 may contain impurities, such as iron particles and dust, which are generated due to wear of the ball screw. If lubrication is performed by use of the lubrication oil 35 containing impurities, such as iron particles and dust, the contact surfaces may be worn away by the impurities. Therefore, the impurities, such as iron particles and dust, must be removed from the lubrication oil 35. In the present embodiment, the lubrication oil 35 is circulated periodically or continuously in order to remove impurities, such as iron particles and dust, from the lubrication oil 35 by use of the filter means 46. Therefore, the contact surfaces of the feed mechanism are not worn away by the impurities, such as iron particles and dust.

Notably, since the quality of the lubrication oil 35 deteriorates with heat or with time, the lubrication oil 35 is desirably exchanged with fresh lubrication oil 35 at predetermined time intervals.

The feed mechanism is cooled by means of the lubrication oil 35. Therefore, when the feed mechanism generates excessive heat due to severe use conditions, the heat generation of the feed mechanism can be suppressed through an increase in the quantity of the lubrication oil 35 stored in the screw-shaft cover member 33 or an increase in the circulation rate of the lubrication oil 35.

Wear of the feed mechanism can be prevented through employment of a cooling unit which is disposed in the lubrication oil supply pipe 34 in order to cool the lubrication oil 35 to thereby cool the screw shaft 26, the return tube 25a, and the balls 29a. Further, the lubrication oil 35 stored in the lubrication oil tank 49 may be cooled through employment of a cooling unit connected to the lubrication oil tank 49.

As described above, in the present embodiment, the perimeters of the screw shaft 26 and the screw nut 25 are covered by the nut cover member 32 and the screw-shaft cover member 33, respectively; and the lubrication oil 35 is stored in the screw-shaft cover member 33 in an amount such that a lower portion of the screw shaft 26 is immersed in the lubrication oil 35 to thereby lubricate the feed mechanism by means of the lubrication oil 35.

Accordingly, a uniform film of the lubrication oil 35 can be maintained on the contact surfaces of the screw shaft 26 and the screw nut 25 through which they come into contact with the balls 29a serving as the power transmission member. Thus, the service lives of the respective portions of the feed mechanism can be extended. Further, the respective portions of the feed mechanism are cooled by the lubrication oil 35. Therefore, wear of the respective portions of the feed mechanism can be prevented in order to extend the service life of the feed mechanism.

Further, impurities, such as iron particles and dust, contained in the lubrication oil 35 are removed by use of the filter means 46, whereby the lubrication oil 35 is cleaned. Therefore, wear of the respective portions of the feed mechanism due to impurities, such as iron particles and dust, can be prevented in order to extend the service life of the feed mechanism.

Next, a second embodiment of the present invention will be described. Repeated descriptions of structural features and operation which are the same as those of the first embodiment will be omitted.

Figure 9:
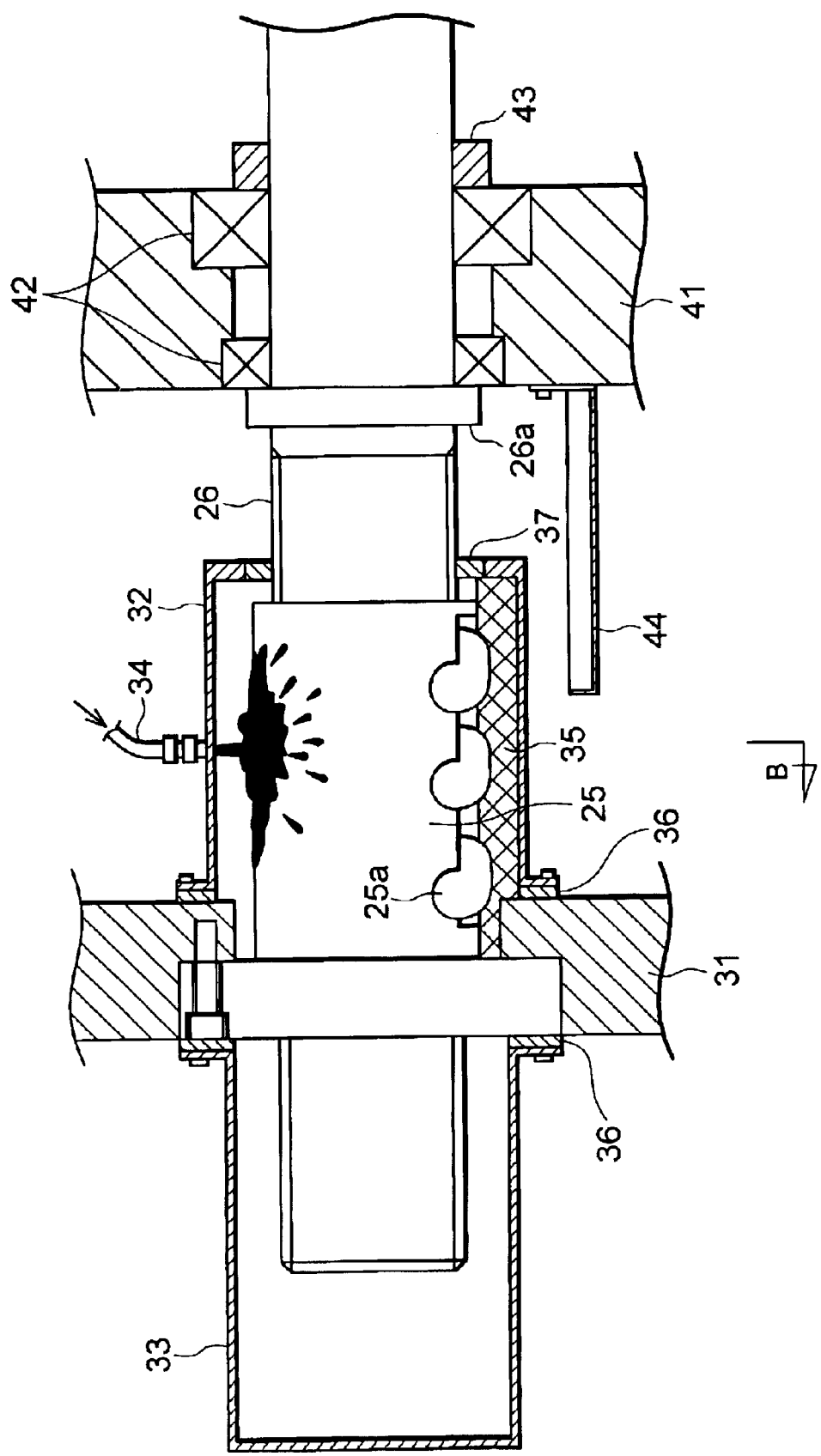
FIG. 9 is a cross sectional view of a lubrication apparatus for a feed mechanism according to a second embodiment of the present invention.
Figure 10:
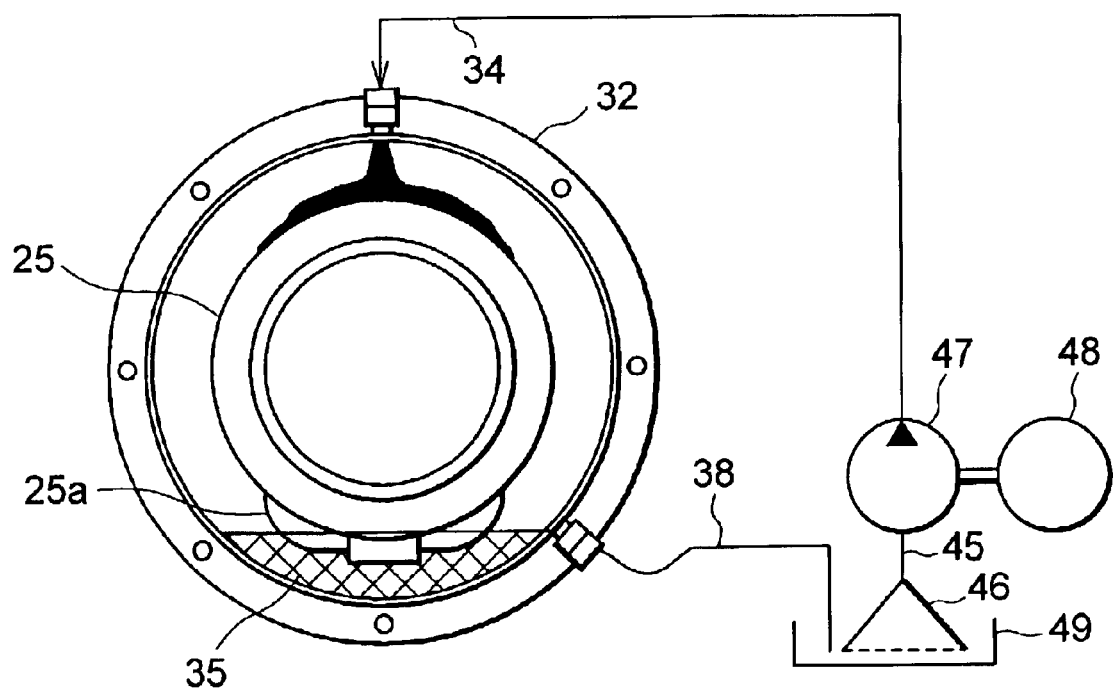
FIG. 10 is a cross-sectional view as viewed in the direction of arrow B in FIG. 9.

FIG. 9 is a cross sectional view of a lubrication apparatus for a feed mechanism according to the second embodiment of the present invention; FIG. 10 is a cross-sectional view as viewed in the direction of arrow B in FIG. 9; and FIG. 11 is a partial cross-sectional view showing the lubrication conditions of the feed mechanism according to the second embodiment of the present invention.

As shown in FIG. 10, in the present embodiment, the lubrication oil supply pipe 34 and the lubrication oil discharge pipe 38 are connected not to the screw-shaft cover member 33 but to the nut cover member 32. One end of the lubrication oil supply pipe 34 is connected to a top portion of the nut cover member 32, and the other end of the lubrication oil supply pipe 34 is connected to the lubrication oil supply pump 47. The lubrication oil 35, which the lubrication oil supply pump 47 pumps from the lubrication oil tank 49 via the suction pipe 45 and the filter means 46, is supplied to the interior of the nut cover member 32 via the lubrication oil supply pipe 34. Although the air bleeder pipe 39 is omitted, the air bleeder pipe 39 may be provided in a manner similar to that in the first embodiment.

As shown in FIG. 10, one end of the lubrication oil discharge pipe 38 is connected to a lower side portion of the nut cover member 32, and the other end of the lubrication oil discharge pipe 38 is connected to the lubrication oil tank 49. By virtue of this configuration, the quantity of the lubrication oil 35 stored inside the nut cover member 32 is controlled in such a manner that the oil level does not exceed the point where the lubrication oil discharge pipe 38 is connected to the nut cover member 32.

Figure 11:
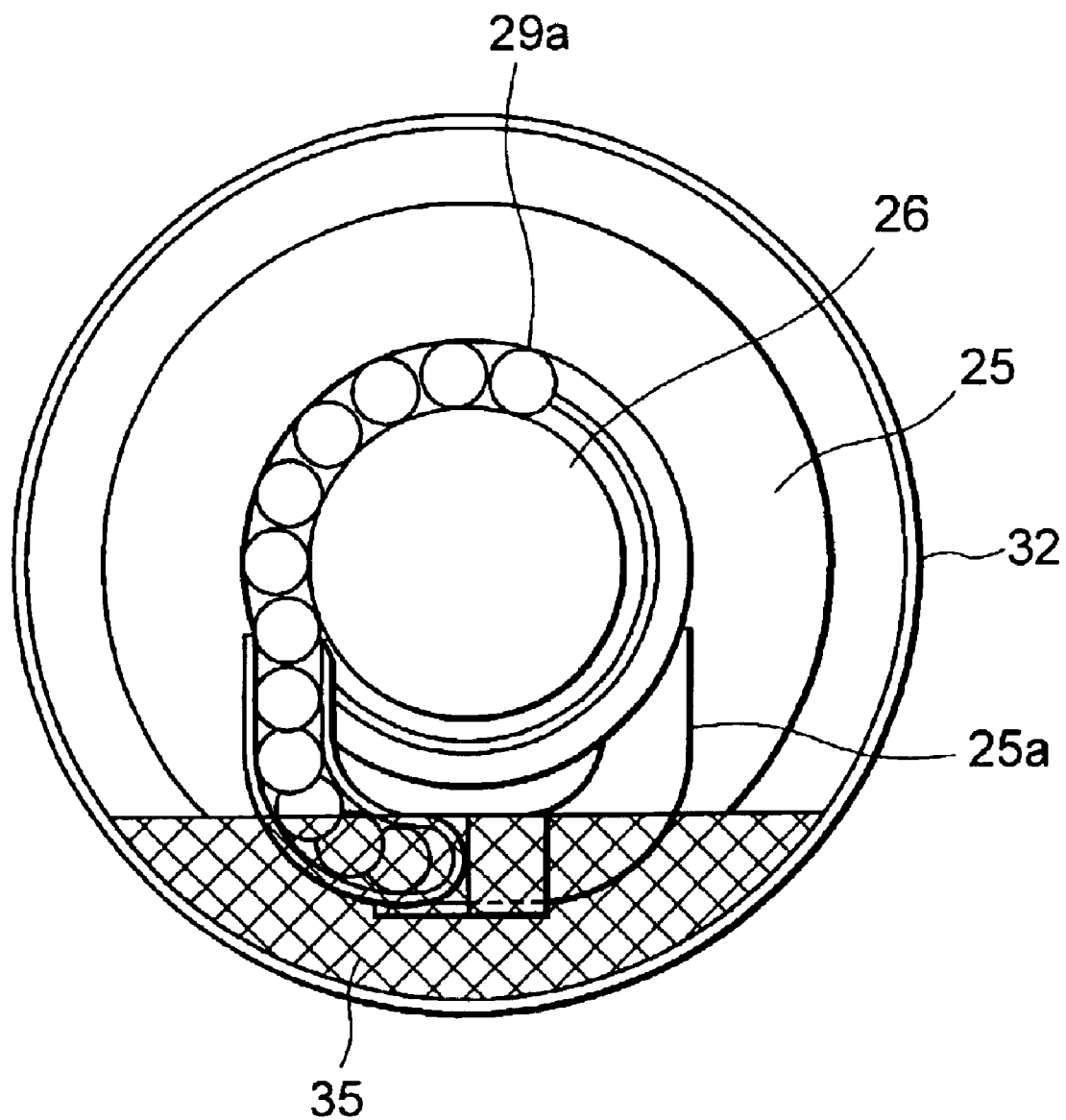
FIG. 11 is a partial cross-sectional view showing the lubrication conditions of the feed mechanism according to the second embodiment of the present invention.

In the present embodiment, the screw nut 25 is attached to the nut support member 31 in such a manner that the return tube 25a is located on the lower side of the screw nut 25, and, as shown in FIG. 11, the oil level is set such that a lower portion of the return tube 25a is immersed in the lubrication oil 35. One or a plurality of fine holes (not shown) are formed in the return tube 25a. Therefore, the lubrication oil 35 is supplied to the interior of the return tube 25a via the hole(s), so that the surfaces of the balls 29a are covered with the lubrication oil 35. Further, since the lubrication oil 35 is supplied to the balls 29a, which circulate along the spiral grooves of the screw shaft 26 and the screw nut 25, an oil film is formed on the surfaces of the spiral grooves.

Further, as shown in FIG. 9, the oil level of the lubrication oil 35 is set such that the oil level does not reach the height of the second seal member 37, disposed between the inner circumferential surface of the circular hole of the nut cover member 32 and the outer circumferential surface of the screw shaft 26. Therefore, the lubrication oil 35 hardly leaks from the clearance between the inner circumferential surface of the circular hole and the outer circumferential surface of the screw shaft 26. Moreover, an oil pan 44 is attached to a side surface (left side surface in FIG. 9) of the screw-shaft support member 41, which surface faces the screw nut 25, and extends to a point below the nut cover member 32. Therefore, when the lubrication oil 35 leaks from the clearance between the inner circumferential surface of the circular hole and the outer circumferential surface of the screw shaft 26, the leaked lubrication oil 35 is received by the oil pan 44 without dripping further downward.

Notably, a cooling unit may be disposed in the lubrication oil supply pipe 34 in order to cool the lubrication oil 35 to thereby cool the screw shaft 26, the return tube 25a, and the balls 29a for the purpose of preventing wear of the feed mechanism. Further, the lubrication oil 35 stored in the lubrication oil tank 49 may be cooled through employment of a cooling unit connected to the lubrication oil tank 49.

As described above, in the present embodiment, the perimeters of the screw shaft 26 and the screw nut 25 are covered by the nut cover member 32 and the screw-shaft cover member 33, respectively; and the lubrication oil 35 is stored in the nut cover member 32 in an amount such that a lower portion of the return tube 25a is immersed in the lubrication oil 35, which is thus supplied to the interior of the return tube 25a.

Since the surfaces of the balls 29a, serving as the power transmission member, are covered with the lubrication oil 35, a uniform film of the lubrication oil 35 can be maintained on the contact surfaces of the screw shaft 26 and the screw nut 25 through which they come into contact with the balls 29a. Thus, the service life of the feed mechanism can be extended.

Next, a third embodiment of the present invention will be described. Repeated descriptions of structural features and operation which are the same as those of the first and second embodiments will be omitted.

Figure 12:
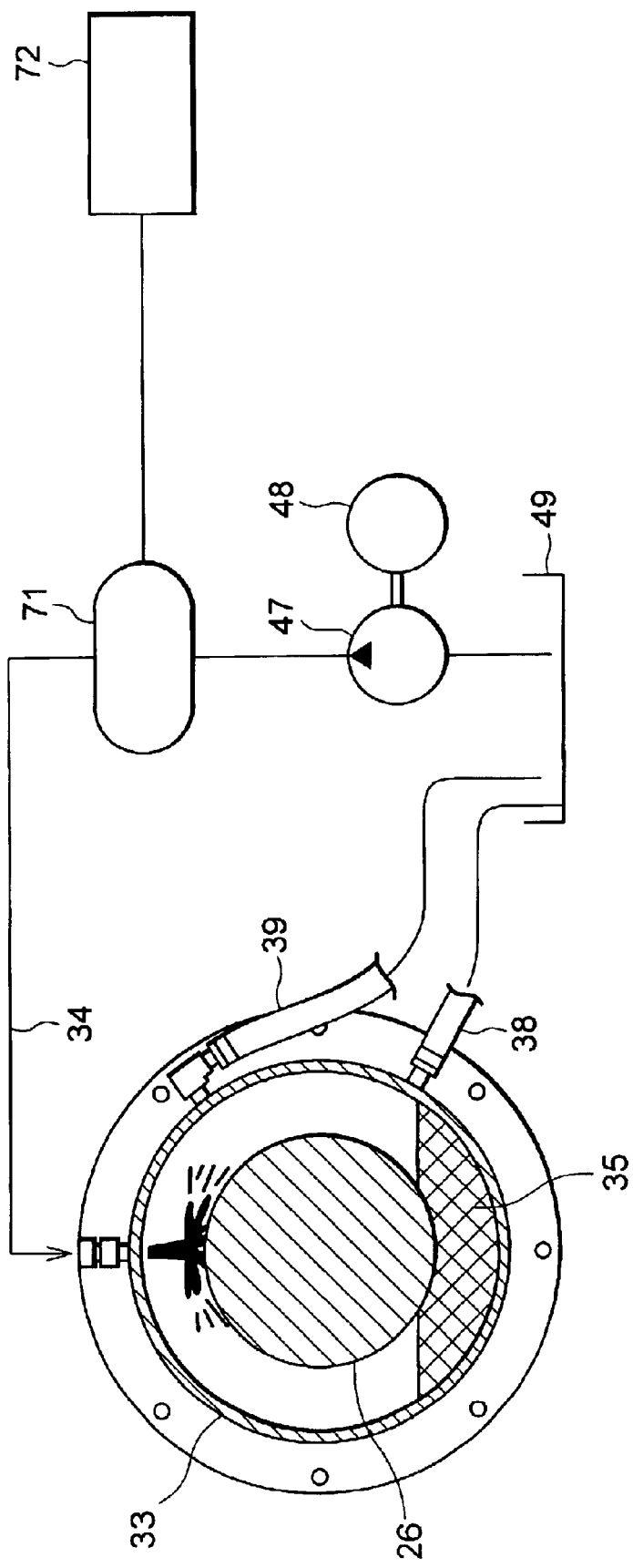
FIG. 12 is a cross-sectional view as viewed in the direction of arrow A in FIG. 3 showing a third embodiment of the present invention.
Figure 13:
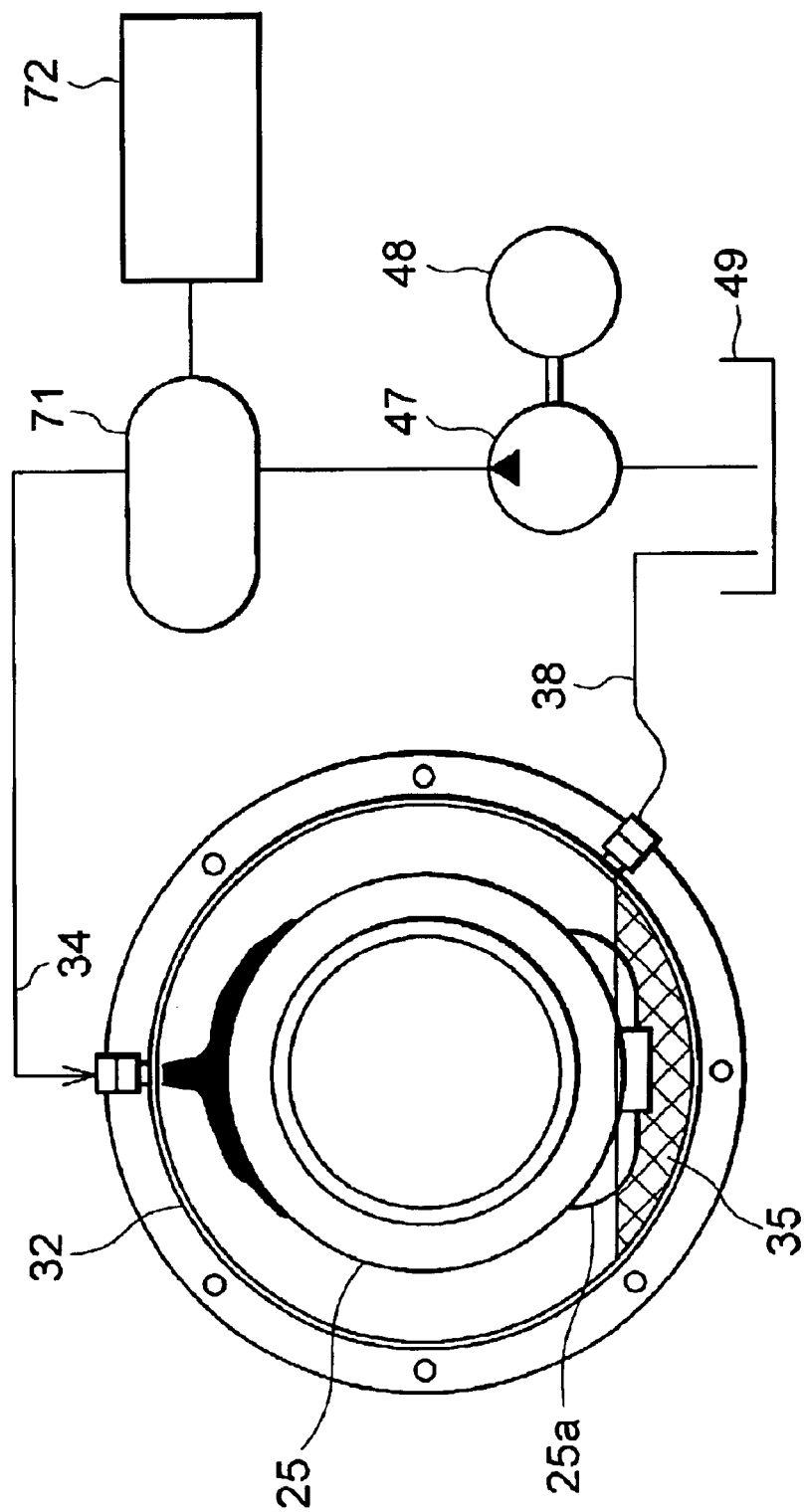
FIG. 13 is a cross-sectional view as viewed in the direction of arrow B in FIG. 9 showing the third embodiment of the present invention.

FIG. 12 is a cross-sectional view as viewed in the direction of arrow A in FIG. 3 showing the third embodiment of the present invention; and FIG. 13 is a cross-sectional view as viewed in the direction of arrow B in FIG. 9 showing the third embodiment of the present invention.

In the present embodiment, an iron-content measurement unit 71 for measuring quantity of iron contained in the lubrication oil 35 is disposed in the lubrication oil supply pipe 34. In the present embodiment, the lubrication oil supply pipe 34 and the lubrication oil discharge pipe 38 may be connected to the screw-shaft cover member 33, as shown in FIG. 12, or to the nut cover member 32, as shown in FIG. 13. Further, the iron-content measurement unit 71 may be disposed in the lubrication oil discharge pipe 38.

The iron-content measurement unit 71 is communicatably connected to a controller 72, which serves as control means for controlling the operation of the molding machine, and transmits to the controller 72 a measurement signal indicative of a measured iron content. The controller 72 displays the measured iron content; calculates the service life of the feed mechanism on the basis of the iron content and displays the same; and, when the iron content is in excess of a preset value, warns an operator that the service life of the feed mechanism has been reached.

Next, the configuration of the iron-content measurement unit 71 will be described in detail.

Figure 14:
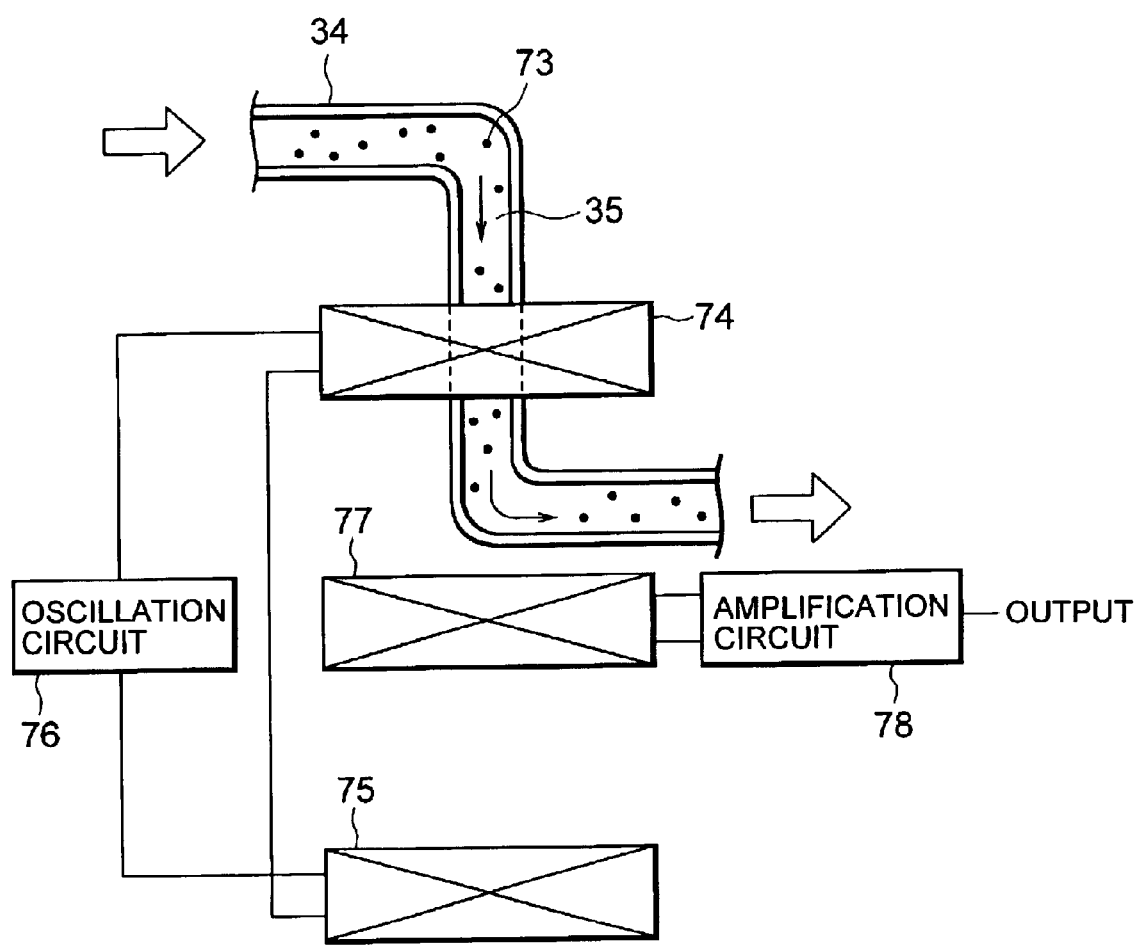
FIG. 14 is a diagram showing the configuration of an iron-content measurement unit used in the third embodiment of the present invention.

FIG. 14 is a diagram showing the configuration of the iron-content measurement unit used in the third embodiment of the present invention.

In FIG. 14, reference numeral 74 denotes a first excitation coil, which is disposed in such a manner that the lubrication oil supply pipe 34 passes through the center thereof. Reference numeral 75 denotes a second excitation coil, which is disposed to face the first excitation coil 74. However, the lubrication oil supply pipe 34 does not pass through the center of the second excitation coil 75. A detection coil 77 is disposed at the midpoint between the first excitation coil 74 and the second excitation coil 75. The first excitation coil 74 and the second excitation coil 75 have the same configuration and are excited by the same current output from an oscillation circuit 76. Therefore, the first excitation coil 74 and the second excitation coil 75 generate magnetic fields of the same intensity in the same direction.

Therefore, at the midpoint between the first excitation coil 74 and the second excitation coil 75, the magnetic field generated by the first excitation coil 74 and that generated by the second excitation coil 75 are cancelled out, so that no electromotive force is induced; i.e., no voltage is generated in the detection coil 77 disposed at the midpoint.

However, when the lubrication oil 35 flowing inside the lubrication oil supply pipe 34, which passes through the center of the first excitation coil 74, contains iron particles 73, the intensity of the magnetic field formed by the first excitation coil 74 increases, upsetting the balance of magnetic fields at the midpoint. Therefore, an electromotive force or voltage is generated in the detection coil 77. The thus generated voltage is amplified by means of an amplification circuit 78 and is sent to the controller 72 as a measurement signal. Since the amplitude of the voltage changes in proportion to the quantity of the iron particles 73 contained in the lubrication oil 35, the quantity of the iron particles 73 can be measured on the basis of the amplitude of the measurement signal.

When the lubrication oil 35 circulates, the iron particles 73 contained in the portion of the lubrication oil 35 located inside the screw-shaft cover member 33 circulate together with the lubrication oil 35. Therefore, the quantity of the iron particles 73 contained in the lubrication oil 35 can be measured by use of the iron-content measurement unit 71 disposed in the lubrication oil supply pipe 34. Notably, the quantity of the iron particles 73 may be measured at all times, or intermittently at intervals corresponding to a frequency at which the lubrication oil supply pump 47 is operated.

When the iron-content measurement unit 71 is operated, the oscillation circuit 76 starts its operation, whereby magnetic fields are generated by the first excitation coil 74 and the second excitation coil 75. When the lubrication oil 35 contains no iron particles 73, the magnetic field generated by the first excitation coil 74 and that generated by the second excitation coil 75 have the same intensity, so that no voltage is generated in the detection coil 77. However, when the lubrication oil 35 flowing inside the lubrication oil supply pipe 34 contains iron particles 73, the intensity of the magnetic field generated by the first excitation coil 74 increases, so that a voltage is generated in the detection coil 77. Since the intensity of the magnetic field generated by the first excitation coil 74 increases in proportion to the quantity of the iron particles 73, the amplitude of the voltage generated by the detection coil 77 also increases in proportion to the quantity of the iron particles 73. Therefore, the quantity of the iron particles 73 can be measured on the basis of the voltage generated by the detection coil 77.

When the measurement signal is sent from the iron-content measurement unit 71 to the controller 72, the controller 72 calculates the service life of the feed mechanism. When the quantity of the iron particles 73 contained in the lubrication oil 35 is in excess of a preset value, the controller 72 provides a warning to the operator. For example, when the iron content of the lubrication oil 35 has exceeded 0.1%, the controller 72 warns the operator to change the lubrication oil 35; and when the iron content of the lubrication oil 35 has exceeded 1.0%, the controller 72 warns the operator to change the feed mechanism, while commenting that the degree of wear of the feed mechanism has reached the allowable limit. The above-described values and contents of warning may be changed freely.

The controller may be configured to continuously display the iron content on a display or meter of the controller. Further, the controller may be configured to stop the molding machine when the controller determines that the feed mechanism has come into an anomalous condition due to excessively high iron content. Alternatively, the controller may be configured to display a predicted service life of the feed mechanism by means of a message reporting, for example, that one month remains before the time for exchange, or that the feed mechanism must be exchanged within one week. In this case, the operator can grasp the timing for exchange, and therefor can make complete preparation for exchange of the feed mechanism.

As described above, in the present embodiment, the iron content of the lubrication oil 35 is measured by use of the iron-content measurement unit 71; and the controller 72 calculates the service life of the feed mechanism on the basis of the measured iron content and warns the operator to replace the lubrication oil 35 or the feed mechanism. Therefore, the service life of the feed mechanism can be predicted

What we claim is:

1. A lubrication apparatus for lubricating a feed mechanism of a forming machine, comprising:
    (a) a conversion mechanism for converting rotational motion to rectilinear motion or converting rectilinear motion to rotational motion; and
    (b) a lubrication oil circulation pipe including a lubrication oil supply pipe for supplying lubrication oil to the conversion mechanism and a lubrication oil discharge pipe for collecting the supplied lubrication oil.

2. A lubrication apparatus according to claim 1, wherein the conversion mechanism includes a screw shaft having a spiral groove; a screw nut having a spiral groove of the same pitch as that of the spiral groove of the screw shaft; and a power transmission member disposed between the spiral groove of the screw shaft and the spiral groove of the screw nut and adapted to transmit power between the screw shaft and the screw nut.

3. A lubrication apparatus according to claim 2, wherein the power transmission member is a group of balls or rollers.

4. A lubrication apparatus according to claim 2, further comprising a storage member for storing lubrication oil in an amount such that at least a portion of the screw shaft is immersed in the lubrication oil.

5. A lubrication apparatus according to claim 4, wherein the storage member covers at least a portion of the screw shaft to an extent such that the portion is immersed in the lubrication oil.

6. A lubrication apparatus according to claim 2, further comprising a storage member for storing lubrication oil in an amount such that at least a lower portion of a return tube of the screw nut is immersed in the lubrication oil.

7. A lubrication apparatus according to claim 6, wherein the storage member covers at least the return tube of the screw nut to an extent such that the return tube is immersed in the lubrication oil.

8. A lubrication apparatus according to claim 1, further comprising filter means disposed in the lubrication oil circulation pipe and adapted to remove impurities contained in the lubrication oil.

9. A lubrication apparatus according to claim 1, further comprising a cooling unit disposed in the lubrication oil circulation pipe and adapted to cool the lubrication oil.

10. A lubrication apparatus according to claim 1, further comprising an iron-content measurement unit disposed in the lubrication oil circulation pipe and adapted to measure iron content of the lubrication oil.

11. A lubrication apparatus according to claim 10, further comprising control means for controlling the forming machine on the basis of the iron content measured by the iron-content measurement unit.

12. A lubrication apparatus according to claim 11, wherein the control means calculates a service life of the conversion mechanism on the basis of the measured iron content.

13. A lubrication apparatus according to claim 11, wherein the control means produces a warning for prompting exchange of the lubrication oil or the conversion mechanism when the measured iron content exceeds a predetermined level.

14. A lubrication method for lubricating a feed mechanism of a forming machine, comprising:
    supplying lubrication oil through a lubrication oil supply pipe to a conversion mechanism for converting rotational motion to rectilinear motion or converting rectilinear motion to rotational motion; and collecting the supplied lubrication oil through a lubrication oil discharge pine.

15. A lubrication method according to claim 14, wherein the conversion mechanism transmits power by means of a screw shaft having a spiral groove; a screw nut having a spiral groove of the same pitch as that of the spiral groove of the screw shaft; and a power transmission member disposed between the spiral groove of the screw shaft and the spiral groove of the screw nut.

16. A lubrication method according to claim 15, wherein the power transmission member is a group of balls or rollers.

17. A lubrication method according to claim 15, wherein at least a portion of the screw shaft is immersed in the lubrication oil.

18. A lubrication method according to claim 17, wherein at least a portion of the screw shaft is covered by a storage member to an extent such that the portion is immersed in the lubrication oil.

19. A lubrication method according to claim 15, wherein at least a lower portion of a return tube of the screw nut is immersed in the lubrication oil.

20. A lubrication method according to claim 19, wherein at least a portion of the return tube of the screw nut is covered by storage member to an extent such that the portion is immersed in the lubrication oil.

21. A lubrication method according to claim 14, further comprising removing impurities contained in the lubrication oil by filter means disposed in the lubrication oil circulation pipe.

22. A lubrication method according to claim 14, further comprising cooling the lubrication oil by a cooling unit disposed in the lubrication oil circulation pipe.

23. A lubrication method according to claim 14, further comprising measuring iron content of the lubrication oil by use of an iron-content measurement unit disposed in the lubrication oil circulation pipe.

24. A lubrication method according to claim 23, further comprising controlling the forming machine by use of control means and on the basis of the iron content measured by the iron-content measurement unit.

25. A lubrication method according to claim 24, further comprising calculating a service life of the conversion mechanism by use of the control means and on the basis of the measured iron content.

26. A lubrication method according to claim 24, wherein the control means produces a warning for prompting exchange of the lubrication oil or the conversion mechanism when the measured iron content exceeds a predetermined level.

27. An injection molding machine, comprising:
   (a) a motor,
   (b) a conversion mechanism being configured to convert rotational motion of the motor to rectilinear motion, and
   (c) a lubrication oil circulation pipe including a lubrication oil supply pipe connected to the upper part of the conversion mechanism, and a lubrication oil discharge pipe connected to the lower part of the conversion mechanism.

28. An injection molding machine according to claim 27, wherein said conversion mechanism includes a screw shaft and a screw nut, and the injection molding machine further comprises a storage member being configured to store the lubrication oil in an amount such that at least a lower portion of a return tube of the screw nut is immersed in the lubrication oil.

29. An injection molding machine according to claim 27, further comprising a filter disposed in the lubrication oil circulation pipe and adapated to remove impurities contained in the lubrication oil.

30. An injection molding machine according to claim 27, further comprising a cooling unit disposed in the lubrication oil circulation pipe and adapted to cool the lubrication oil.

31. An injection molding machine according to claim 27, further comprising an iron-content measurement unit disposed in the lubrication oil circulation pipe and adapted to measure iron content of the lubrication oil.

32. An injection molding machine according to claim 31, further comprising a controller being adapted to control the forming machine on the basis of the iron content measured by the iron-content measurement unit.

33. An injection molding machine according to claim 32, wherein the controller calculates a service life of the convention mechanism on the basis of the measured iron content.

34. An injection molding machine, comprising:
   (a) a motor,
   (b) a conversion mechanism being configured to convert rotational motion of the motor to rectilinear motion, and
   (c) a lubrication oil circulation pipe including a lubrication oil supply pipe connected to the conversion mechanism in a direction perpendicular to the axis thereof, and a lubrication oil discharge pipe connected to the conversion mechanism in a direction perpendicular to the axis thereof.

35. An injection molding machine according to claim 34, wherein said conversion mechanism includes a screw shaft and a screw nut, and the injection molding machine further comprises a storage member being configured to store the lubrication oil in an amount such that at least a lower portion of a return tube of the screw nut is immersed in the lubrication oil.

36. An injection molding machine according to claim 34, further comprising a filter disposed in the lubrication oil circulation pipe and adapted to remove impurities contained in the lubrication oil.

37. An injection molding machine according to claim 34, further comprising a cooling unit disposed in the lubrication oil circulation pipe and adapted to cool the lubrication oil.

38. An injection molding machine according to claim 34, further comprising an iron-content measurement unit disposed in the lubrication oil circulation pipe and adapted to measure iron content of the lubrication oil.

39. An injection molding machine according to claim 38, further comprising a controller being adapted to control the forming machine on the basis of the iron content measured by the iron-content measurement unit.

40. An injection molding machine according to claim 39, wherein the controller calculates a service life of the conversion mechanism on the basis of the measured iron content.

* * * * *